May 27, 1969            D. L. DOUTY            3,446,361
RACK AND METHOD OF MAKING THE SAME
Filed Dec. 23, 1966
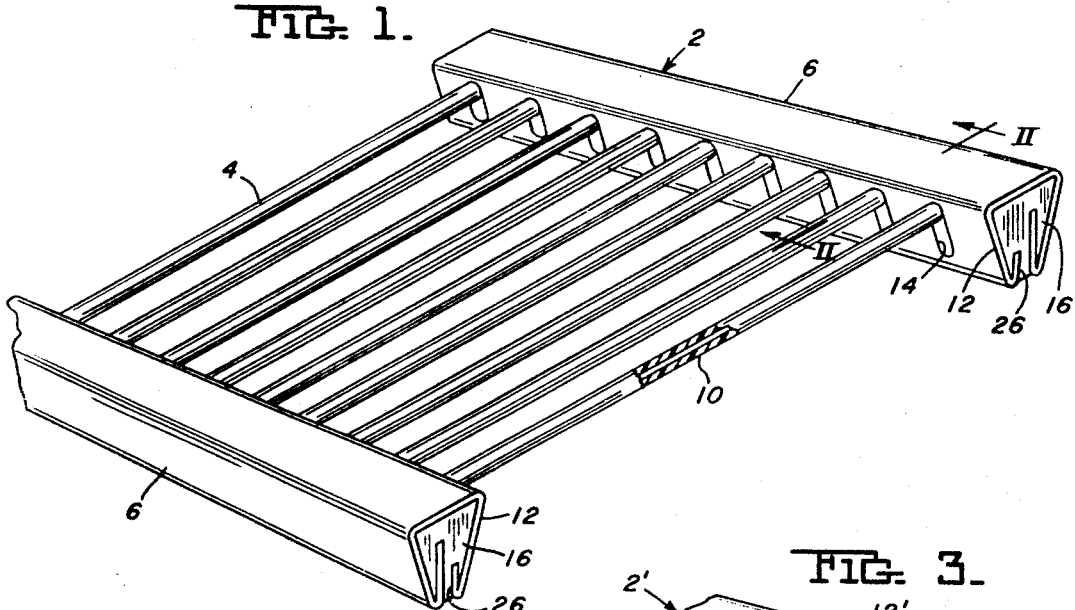
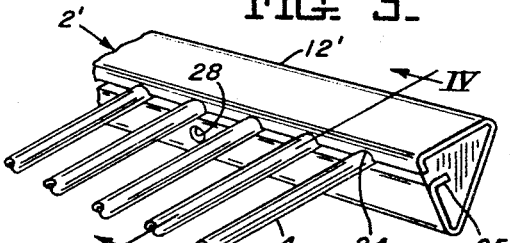
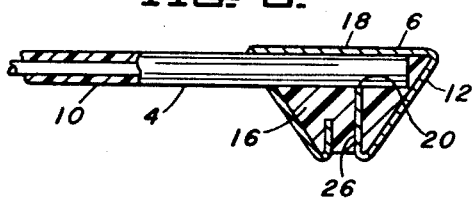
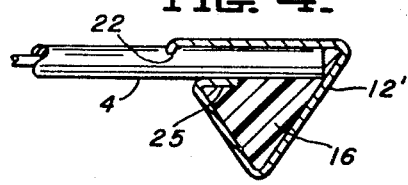
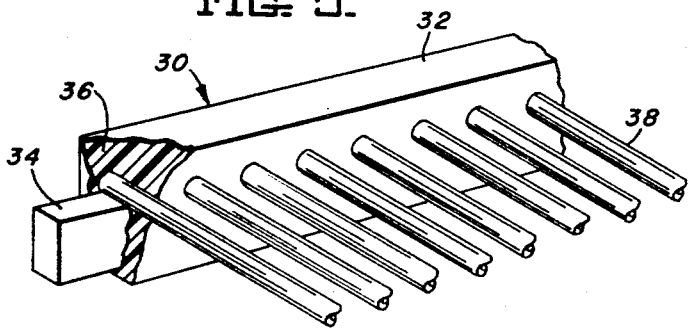
INVENTOR.
DONALD L. DOUTY
By Donald G. Dalton
Attorney

United States Patent Office 3,446,361
Patented May 27, 1969

3,446,361
RACK AND METHOD OF MAKING THE SAME
Donald L. Douty, Franklin Township, Westmoreland County, Pa., assignor to United States Steel Corporation, a corporation of Delaware
Filed Dec. 23, 1966, Ser. No. 604,281
Int. Cl. A47f *5/00;* C09d *5/02, 5/04*
U.S. Cl. 211—153      2 Claims

ABSTRACT OF THE DISCLOSURE

A wire rack comprising plastic-coated cross members such as wires extending across the rack and connected to metal edge members by a plastic material in each edge member that forms a homogeneous bond with the plastic on the wires. The method of making the rack includes pre-coating the wires with a plastic material, connecting the wires to the metal edge members by application of additional plastic material, and then curing the additional plastic to form a homogeneous bond.

---

This invention relates to a rack made of plastic-coated wires or similar cross members, and a method of assembling such a rack. The rack may be used as a shelf in a refrigerator, the back and seat portions of a chair, or any of a number of different uses requiring different types of wire or other cross members.

Present wire racks are made by laying many wires across two edge members and then welding the wires to the edge members. The exposed cut ends of the wires must be finished to eliminate the dangerous sharp edges. After the finishing operation, some racks are dipped in plastic for decorative and protective purposes, while others are protected by chrome plating.

The foregoing rack and method of manufacture have a number of disadvantages which my novel rack and method have overcome. First, the cut ends of the wires of my rack are not exposed, and therefore I have made unnecessary the step of finishing these ends to eliminate the dangerous sharp edges.

Also, my rack is made without any welding operation, an expensive step in the manufacture of present racks since the machines for mass assembly and welding of these racks are very intricate and costly.

Another advantage of my rack over the present racks is that I obtain a stronger connection of the individual wires to the edge members, thereby increasing the overall strength of the rack while maintaining light weight.

Still another advantage of my rack over the present plastic-dipped racks lies in the many different colors of plastic-coated wires that can be used in making one of my racks. Since the present wire racks are dipped in plastic only after they are assembled, it is impractical to coat the individual wires of each of these racks with plastic different colors.

These and other advantages will appear more readily from the following detailed description of my invention and the attached drawings in which:

FIGURE 1 is a perspective view of a rack embodying my invention;

FIGURE 2 is a sectional view of an edge portion of the rack of FIGURE 1, taken along line II—II of FIGURE 1;

FIGURE 3 is a perspective view of a portion of another rack embodying my invention;

FIGURE 4 is a sectional view of an edge portion of the rack of FIGURE 3, taken along line IV—IV of FIGURE 3; and FIGURE 5 is a perspective view of still another rack showing another embodiment of my invention.

A rack 2, shown in FIGURE 1, is made of a series of parallel wires 4 connected between two parallel edge members 6. Each wire 4 has a plastic coating 10.

The construction of each edge member 6 is seen most clearly in FIGURE 2. A metal shell 12 is brake or roll formed to the configuration shown. Holes 14 are drilled or punched in one side of the shell 12 (FIGURE 1), and a wire 4 is inserted through each of these holes. A plastic filling 16 compatible with the vinyl plastic coating 10 on the wires 4 fills the void within the metal shell 12 and forms a homogeneous bond with the plastic coating 10.

The foregoing structure thus provides a weld-free attachment of the wires to the edge member. The wires cannot move laterally and parallel to the edge members 6, because they are restrained by the edges of holes 14. They cannot move up or down because they are positioned between top side 18 and longitudinal edge 20 of the steel shell 12. The homogeneous bond between the plastic filling 16 and the plastic 10 on the wires 4 prevents the wires from being pulled lengthwise out of the holes 14.

In another embodiment of my invention (FIGURES 3 and 4), rack 2' has a metal shell 12' formed in a slightly different configuration than the shell 12. Edge 22 (FIGURE 4) of the shell 12' depends slightly below the top of the wire 4, and the wires 4 are held between notches 24 (FIGURE 3) in the edge 22 and a flange portion 25 of shell 12'.

In the manufacture of either the rack 2 (FIGURE 1) or rack 2' (FIGURE 3), the wires 4 are first coated individually with the plastic material 10. Different colors of plastic may be used for each wire to obtain various color patterns in the finished rack. The plastic material 10 should be bonded to each wire core, so that when it is in turn bonded to the plastic filling 16 in the edge members 6, the ends of each wire core will be firmly anchored within the edge members 6. The plastic material 10 may be vinyl or any other hard setting plastic. Either thermosetting or thermoplastic materials are acceptable.

To form the rack 2 of FIGURES 1 and 2, the wires 4 are dropped between edge members 6, which are held in an upside down position from that shown in FIGURE 1. The ends of the wires pass through the holes 14, which are elongated to allow the wires to drop in more easily. Then, the edge members 6 are moved toward each other to force the ends of the wires 4 between the edge 20 and side 18 of the shell 12 (FIGURE 2). The same steps are used for inserting the wires 4 in notches 24 of metal shell 12' (FIGURE 3), but the operation is more difficult since the notches 24 are not elongated like the holes 14. Thus, the end wires 4 must be fed through smaller openings.

The plastic filling 16 is either metered or introduced under pressure through longitudinal slots 26 of shells 12 (FIGURE 1) or sprue holes 28 of shell 12' (FIGURE 3). Mold covers over the shells 12 and 12' (not shown) keep the plastic filling from running out the other openings in the sides and ends of the shells.

The plastic filling 16 must be compatible with the plastic coating 10 on the wires 4, so that when cured it will form a homogeneous bond with this plastic coating. If the wires 4 are coated with vinyl, either vinyl plastisol or an epoxy resin would be acceptable, as they are both compatible with vinyl. If vinyl plastisol is used, it may be fed at room temperature into the metal shells 12 or 12', and then heat cured at 350° F. for 20 minutes in a gas-fired convection furnace. By preheating the metal shells, the mold covers, and the vinyl plastisol to temperatures up to 300° F., the time of the heat cure may be reduced to as short as 12 minutes or less. If an epoxy resin is used, no heat is applied, but the resin should be allowed to stand for an air cure of at least 12 hours. Epoxy resins form a generally stronger bond, but they have the disadvantage of shrinking slightly during curing. Vinyl plastisol, on the other hand, exhibits minute swelling on curing.

The plastic filling 16 should be bonded also to the metal shells 12 or 12'. With an epoxy resin, this bond will occur naturally but with vinyl plastisol, the inner surfaces of the metal shells must be coated with a primer.

Another embodiment of my invention is shown by the wire rack 30 of FIGUIE 5. Edge members 32 of this rack have no metal shell, but they include instead metal bars 34 that are embedded in plastic coverings 36.

To construct the rack 30, the ends of plastic-coated wires 38 are placed in molds of the same shape as the edge members 32. Then, metal bars 34 are placed in contact with coated wires 38 in the manner shown, and the plastic 36 is introduced into the molds and cured until it bonds to the palstic on the wires 38. Also the plastic coverings 36 should also be bonded to the bars 34, either by a natural bond as with epoxy resins, or by priming agents. When the plastic coverings 36 have cured, they are stripped from their molds, and each edge member 32 appears as shown in FIGURE 5. The mold should be designed to provide a minimum thickness of ⅛ inch of plastic over the entire surface of the bar 34 of each edge member, in order to provide an even surface appearance.

I claim:
1. A rack comprising:
 a plurality of cross members extending the width of said rack, each of said cross members having a plastic coating which extends the width of said rack,
 an elongated metal shell extending the length of said rack and across said cross members and having a side wall with holes spaced along the length thereof, said side wall being at an acute angle to the plane of said cross members, said holes being elongated in a direction perpendicular to the lentgh of the shell, and said cross members extending through said elongated holes into the space within the side walls of said metal shell, and
 a hardened plastisol filling the space within the side walls of said metal shell, said plastisol surrounding said cross members and having a homogeneous bond with the palstic coating on said cross members.

2. A method of making a rack comprising the steps of dropping a plurality of plastic-coated cross members into elongated holes in an inclined side wall of an elongated metal shell:
 moving said metal shell relative to said plastic-coated cross members so that said cross members extend further into the space within the side walls of said metal shell,
 introducing a liquid plastisol into a slot extending along the lentgh of said shell so as to fill the space between the side walls of the metal shell with the plastisol and cover the inserted potrions of said plastic-coated cross members, and
 curing said plastisol to form a homogeneous bond between said plastisol and said plastic-coated cross members.

References Cited

UNITED STATES PATENTS

| | | | |
|---|---|---|---|
| 2,804,213 | 8/1957 | Fox et al. | 211—181 X |
| 2,885,132 | 5/1959 | Campbell | 182—46 |
| 2,932,358 | 4/1960 | Hopfeld | 182—46 |
| 3,083,836 | 4/1963 | Bussemer | 211—181 X |
| 3,158,224 | 11/1964 | Van Name et al. | 182—46 |
| 3,225,862 | 12/1965 | Fink | 182—46 |

FOREIGN PATENTS 96,991  9/1963  Denmark.

ROY D. FRAZIER, *Primary Examiner.*

FRANK DOMOTOR, *Assistant Examiner.*

U.S. Cl. X.R.

29—160, 458, 460; 52—690; 182—46; 256—17; 264—135, 248, 250, 263, 267, 277

UNITED STATES PATENT OFFICE
CERTIFICATE OF CORRECTION

Patent No. 3,446,361                                                                          May 27, 1969

Donald L. Douty

It is certified that error appears in the above identified patent and that said Letters Patent are hereby corrected as shown below:

Column 1, line 12, "A wire rack" should read -- A rack --. Column 3, line 8, "FIGUIE 5" should read -- FIGURE 5 --; same column 3, line 16 and column 4, line 3, "palstic", each occurrence, should read -- plastic --; same column 4, line 13, "lentgh" should read -- length --; line 15, "potrions" should read -- portions --.

Signed and sealed this 21st day of April 1970.

(SEAL)
Attest:

Edward M. Fletcher, Jr.                                        WILLIAM E. SCHUYLER, JR.
Attesting Officer                                                          Commissioner of Patents